UNITED STATES PATENT OFFICE.

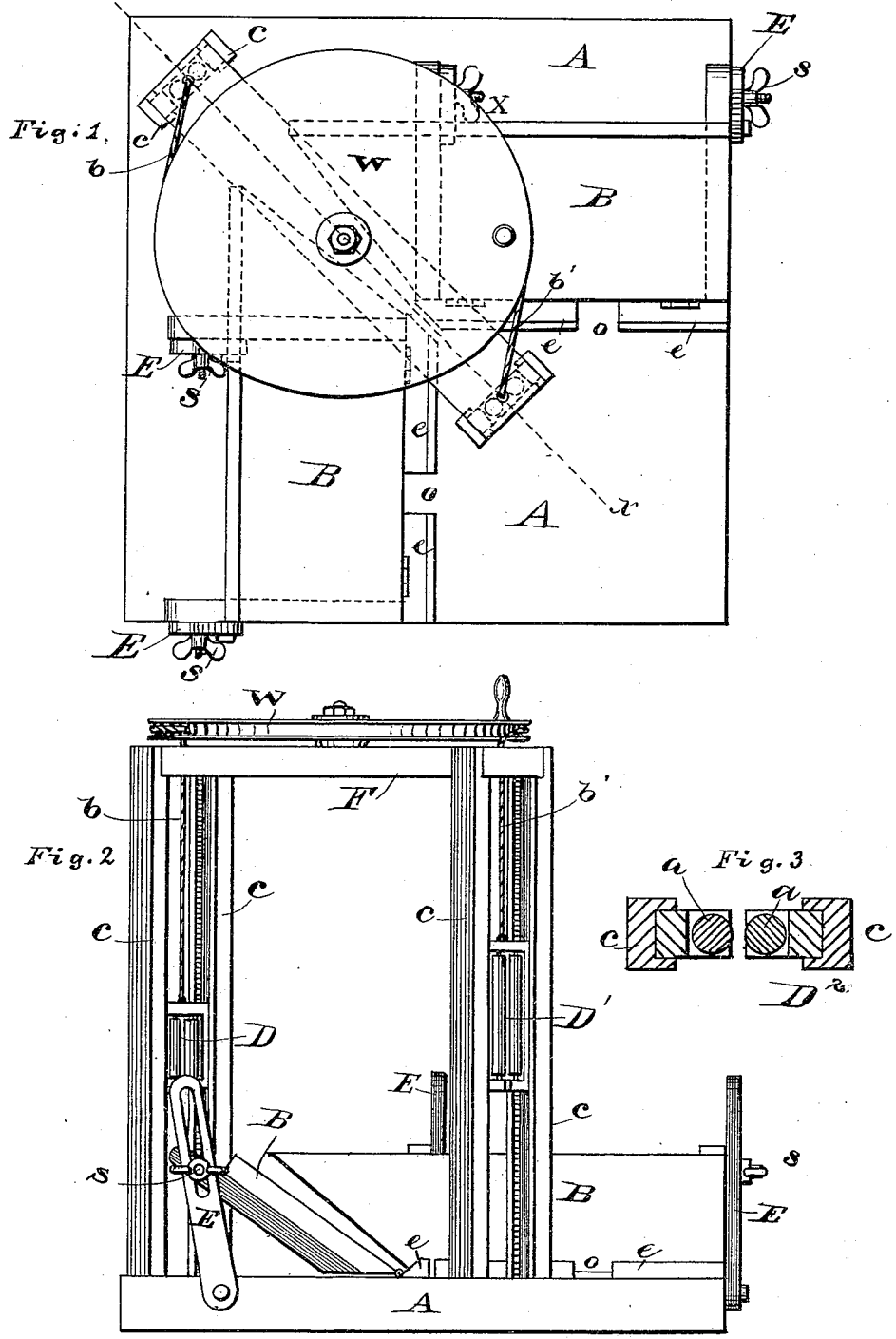

WILLIAM F. YOUNG AND CHARLES R. DRAKE, OF CHICAGO, ILLINOIS.

MACHINE FOR CUTTING BEVELED AND MITER JOINTS.

SPECIFICATION forming part of Letters Patent No. 265,356, dated October 3, 1882.

Application filed June 15, 1882. (No model.)

*To all whom it may concern:*

Be it known that we, WILLIAM F. YOUNG, a subject of the Queen of Great Britain, and CHARLES R. DRAKE, a citizen of the United States of America, residing at Chicago, in the county of Cook and State of Illinois, have invented an Improvement in Machines for the Manufacture of Beveled and Miter Joints, of which the following is a specification.

Our invention relates to a device for cutting beveled miter-joints, particularly adapted for cutting miters on the beveled sides of carriage or wagon seats, or on the sides of hoppers or boxes where said sides stand flaring or at an angle; and our invention consists in adjustable wings or supports adjustable to any desired angle and adapted to hold the article to be cut, in combination with guides for guiding a saw or other cutting-tool at the proper angle to form the miter; and it further consists in combinations and arrangements of parts, as hereinafter more fully set forth with reference to the accompanying drawings, in which—

Figure 1 is a plan view of our improved device; Fig. 2, a side elevation of the same; and Fig. 3, a detailed view, referred to hereinafter.

Similar letters refer to similar parts throughout the several views.

In the said drawings, A A represent the base of the device, to which are hinged, at a suitable angle to each other, the adjustable wings B B, which may be adjusted to and held at any angle to the base A by the slotted supports E and thumb-screws $s$. Standing perpendicular to the base A A, and secured thereto, are posts $c$ $c$, between which slide the saw-guides D D', which consist of a frame, $D^2$, with rollers $a$ $a$ journaled therein. (Shown in section in Fig. 3.) The posts $c$ $c$ are so arranged with relation to the wings B B that a plane passing through said posts on the line $x$ $x$ forms a miter with said wings B B. They are connected at the top by a cross-piece, F, on which is journaled a hand-wheel, W, to the periphery of which are attached cords $b$ $b'$, attached at their other ends to the top of the saw-guides D D'. By turning the hand-wheel W the cords $b$ $b'$ are wound around the periphery thereof and the guides D D' drawn up to the top of the posts $c$. A cleat, $e$, is placed at the bottom of each of the wings B, against which the edge of the board or other article to be cut rests. These cleats are cut away at $o$ sufficiently to allow the placing of a bevel on the base A A and against the wings B, in order to set them at the proper angle. The wings having been adjusted to the proper angle, the article to be cut is placed thereon and a hand-saw inserted in the guides D D'. By turning the hand-wheel W the guides D D' are allowed to rest on and guide the saw during the operation of sawing, which is done in the ordinary manner. The saw-guide D', on the side of the device from which the saw is inserted, is made longer than the one D, to correspond with the taper of the saw, an ordinary hand-saw being used, and thus more firmly guide it during the operation of sawing; and in order that the said guides may be raised proportionately upon turning the hand-wheel W said wheel is cut away at $x$, making the circle on which the cord $b'$ is wound smaller than the one for cord $b$.

With this device a miter may be easily and accurately cut, so that the article mitered will stand at any desired angle.

Having thus described our invention, what we claim as new, and desire to secure by Letters Patent, is—

1. The combination of the guiding-posts $c$ $c$, arranged in pairs, guides D D', composed of frames $D^2$, supported between said posts, and having rollers $a$ $a$, cross-piece F, connecting the guide-posts, hand-wheel W, journaled above the cross-piece, and the cords $b$ $b'$, connecting the wheel with the guides D D', substantially as shown and described.

2. The combination of the base or frame A, wings B B, capable of being adjusted to any desired angle with said base, guiding-posts $c$ $c$, guides D D', arranged between said posts, hand-wheel W, and cords $b$ $b'$, connecting said wheel and guides, substantially as shown and described.

3. The combination of the base A, adjustable wings B B, slotted supports E, and thumb-screws $s$ for adjusting and supporting the wings at any desired angle, cleats $e$ $e$, arranged at the bottom of each wing, guide-posts $c\,c$, arranged in pairs and connected at the top by cross-piece F, guides D D', adapted to move vertically between said guiding-posts, and hand-wheel W, having cords $b\,b'$ connected with the guides D D', substantially as shown and described.

In testimony whereof we affix our signatures in presence of two witnesses.

WILLIAM F. YOUNG.
CHARLES R. DRAKE.

Witnesses:
C. S. HARRISON,
FRANK JOHNSON.